United States Patent [19]
Gunji

[11] Patent Number: 5,224,145
[45] Date of Patent: Jun. 29, 1993

[54] X-RAY BEAM LIMITING APPARATUS INCLUDING PIVOTABLE BLADE

[75] Inventor: Teruomi Gunji, Ootawara, Japan

[73] Assignee: Kabushiki Kaisha Toshiba, Kanagawa, Japan

[21] Appl. No.: 882,237

[22] Filed: May 8, 1992

Related U.S. Application Data

[63] Continuation of Ser. No. 673,816, Mar. 22, 1991, abandoned.

[30] Foreign Application Priority Data

Mar. 28, 1990 [JP] Japan ............... 2-79537

[51] Int. Cl.[5] ............................................. G21K 1/04
[52] U.S. Cl. ........................................ 378/150; 378/41; 378/153
[58] Field of Search ................. 378/41, 42, 147, 150, 378/153, 152, 156, 159

[56] References Cited
U.S. PATENT DOCUMENTS

4,641,335  2/1987  Hahn ........................... 378/41
4,766,603  8/1988  Okabe et al. .................. 378/152

*Primary Examiner*—David P. Porta
*Attorney, Agent, or Firm*—Finnegan, Henderson, Farabow, Garrett & Dunner

[57] ABSTRACT

An X-ray beam limiting apparatus, is used for a stereoscopic X-ray tube with two focal points separated from each other by a distance of approximately 35 mm. The X-ray beam limiting apparatus includes pivotable blade means for beam-limiting inner edges of pyramid-shaped X-ray beams emitted from the first and second X-ray focal points, while pivoting around center lines of first and second pivotable shafts positionally shifted with each other; and, first slidable blade means for beam-limiting outer edges of the pyramid-shaped X-ray beams emitted from the first and second X-ray focal points, while sliding on a plane substantially perpendicular to travelling paths of the pyramid-shaped X-ray beams.

6 Claims, 6 Drawing Sheets

X-RAY BEAM LIMITING APPARATUS INCLUDING PIVOTABLE BLADE

This application is a continuation, of application Ser. No. 07/673,816, filed Mar. 22, 1991, now abandoned.

BACKGROUND OF THE INVENTION

1. Field of the Invention

The present invention generally relates to an X-ray beam limiting apparatus for projecting X-ray beams emitted from two X-ray focal points separated by a predetermined distance, toward a common projection field at an X-ray detecting plane. More specifically, the present invention is directed to an X-ray beam limiting apparatus used for stereoscopic radiography and fluoroscopy, in which pyramid-shaped X-ray beams emitted from two X-ray focal points narrowly separated with each other are effectively limited by a pivotable blade.

2. Description of the Related Art

Conventionally, stereoscopic radiography or fluoroscopy has been widely utilized with employment of the X-ray tube having two separate X-ray focal points. In performing such a stereoscopic radiography or fluoroscopy, X-ray beams emitted from the respective focal points of the X-ray tube are alternately irradiated or projected toward a biological body, e.g., a patient, and the X-ray beams which have passed through this biological body are detected by either the X-ray film, or image intensifiers. Then, based on the X-ray detection information obtained by this X-ray detecting device, one X-ray image of the biological body produced from the X-ray beams emitted from one X-ray focal point is observed by a righthand eye of a viewer, whereas the other X-ray image thereof produced from the X-ray beams emitted from the other X-ray focal point is observed by a lefthand eye of this viewer, whereby the X-ray image of the biological body may be stereoscopically observed by the viewer.

Figure 1:
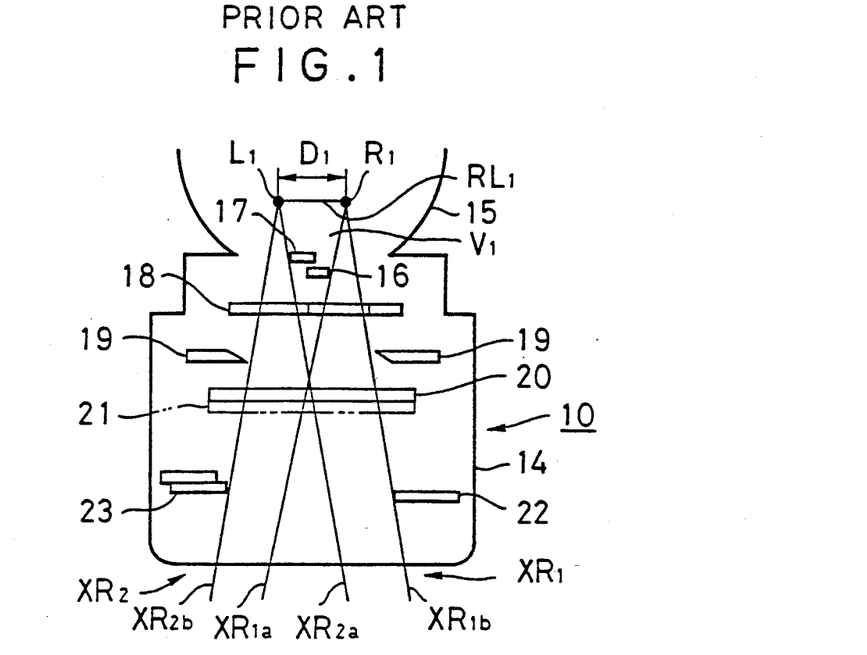
FIGS. 1 and 2 schematically represent the conventional X-ray beam limiting apparatus 10.
Figure 2:
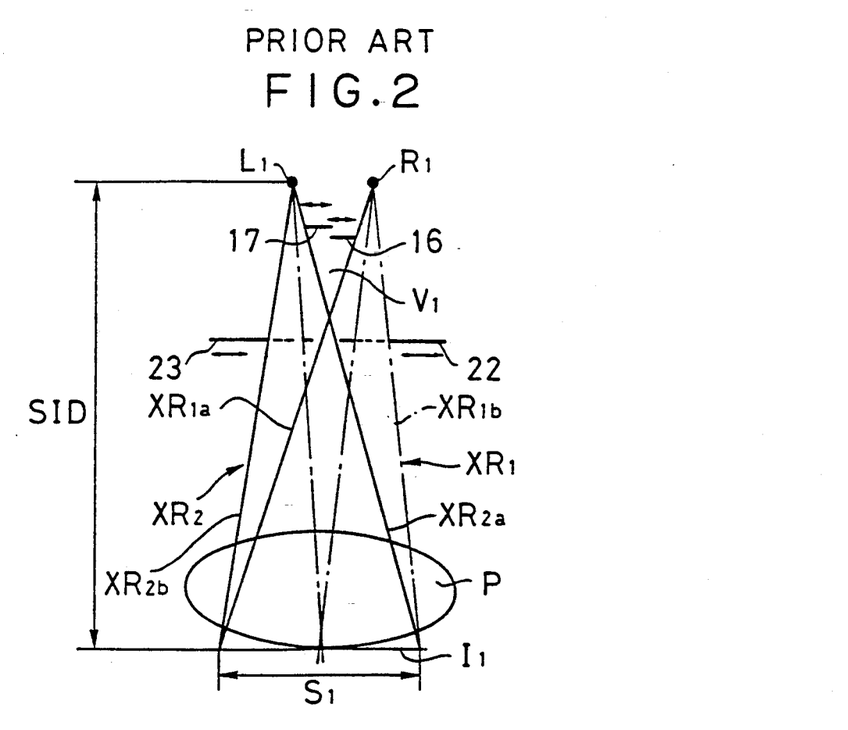

The above-described stereoscopic radiography, or fluoroscopy is known in the art, for instance, U.S. Pat. No. 4,766,603 issued to Okabe, entitled "APERTURE DEVICE OF RADIATION DIAGNOSTIC APPARATUS" on Aug. 23, 1988. FIG. 1 is a schematic sectional view of the conventional X-ray beam limiting apparatus 10 disclosed in the above-described U.S. Pat. No. 4,766,603, and also FIG. 2 is an explanatory diagram for representing operations of this X-ray beam limiting apparatus 10.

In FIG. 1, a stereoscopic X-ray tube 15 has two X-ray focal points "$R_1$" and "$L_1$" separated from each other. The above-described X-ray beam limiting apparatus 10 is mounted at the X-ray projection side of this X-ray tube 15. The X-ray beam limiting apparatus 10 is so constructed that pyramid-shaped X-ray beams "$XR_1$" and "$XR_2$" emitted from the respective X-ray focal points "$R_1$" and "$L_1$" of the stereoscopic X-ray tube 15 are alternately projected to a common projection field "$S_1$" at an X-ray detecting plane "$I_1$" under beam limiting effects.

Normally, such an X-ray stereoscopy is carried out under condition that a biological body "P" under medical examination is positioned in close contact with this X-ray detecting plane "$I_1$" and therefore is so-called as a "contact X-ray stereoscopy, or fluoroscopy". In accordance with the feature of this contact X-ray stereoscopy, since the X-ray images of the biological object are detected with approximately 1:1 correspondance, the distance between two X-ray focal points "$R_1$" and "$L_1$" is selected to be approximately 63 mm equal to a distance between human eyes.

The construction of this conventional X-ray beam limiting apparatus 10 will now be described.

The X-ray beam limiting apparatus 10 includes first rectangular blades 16 and 17 arranged in a triangular space "$V_1$" defined by two inside edges "$XR_{1a}$" and "$XR_{2a}$" of the pyramid-shaped X-ray beams "$XR_1$" and "$XR_2$", and also a line "$RL_1$" connecting two separate focal points "$R_1$" and "$L_1$". The first rectangular blades 16 and 17 are positioned at the X-ray projection side of the stereoscopic X-ray tube 15 and have a function to limit these X-ray beams. Furthermore, a circular fixed blade 18 is employed below the first rectangular blades 16 and 17 along the X-ray beam travel path so as to shield the X-ray beams which would exceed an outer case (not shown) of the X-ray detecting plane "$I_1$". Also, a compensating filter blade 19 is similarly positioned below the circular fixing blade 18 in order to compensate for differences in X-ray absorption occurring in a heart and a lung. The conventional X-ray beam limiting apparatus 10 further employs second rectangular blades 20 and 21 arranged below the compensating filter blade 19 to set the rectangular X-ray projection field; third rectangular blades 22 and 23 also arranged below the second rectangular blades 20 and 21 and outside the outer edges "$XR_{1b}$" and "$XR_{2b}$" of the pyramid-shaped X-ray beams "$XR_1$" and "$XR_2$" in order to beam-limit the outer edges "$XR_{1b}$" and "$XR_{2b}$"; an outer cover 14; stepping motors (not shown in detail) each for horizontally moving the above-described blades 16, 17, 19 to 23 except for the circular fixing blade 18; and also a controller (not shown) for controlling rotations of these stepping motors.

A distance "SID" (abbreviated "X-ray Source To Image Receptor Distance") among the X-ray focal points "$R_1$", "$L_1$" and the X-ray detecting plane "$I_1$". In this case, the controller transfers a predetermined number of rotation pulses to the respective stepping motors for driving the corresponding beam-limiting blades 16, 17, 19 to 23 in such a manner that a desirable common projection field "$S_1$" defined at the X-ray detecting plane "$I_1$" may be established by the beam-limited pyramid X-rays "$XR_1$" and "$XR_2$" emitted from the X-ray focal points "$R_1$" and "$L_1$".

As is known in the stereoscopic radiography or fluoroscopy, highspeed continuous photographing operations such as several X-ray film sheets per one second and several tens of images per one second for the X-ray photography with the image intensifiers. Very recently, a strong demand is made for an enlarged type of stereoscopic radiography capable of performing the stereoscopic radiographing operation at a high speed with enlarged images.

In case of such an enlarged type stereoscopic radiography, the object under medical examination "P" is positioned, for instance, in between the two X-ray focal points $R_1$, $L_1$, and the X-ray detecting plane "$I_1$", and also the distance $D_1$ between these focal points $R_1$ and $L_1$ is reduced to approximately 35 mm (normally 63 mm).

However, if the distance "$D_1$" between two X-ray focal points "$R_1$" and "$L_1$" would be set to 35 mm, the triangle space "$V_1$" defined by the inner edges "$XR_{1a}$" and "$XR_{2a}$" of the pyramid X-rays "$XR_1$" and "$XR_2$" within which the first rectangular blades 16 and 17 are arranged would be narrowed, as compared with that of the normal distance "$D_1$" (=63 mm). As a result, there is a problem that the sufficient X-ray beam limiting operation could not be achieved by horizontally driving the conventional first rectangular (horizontally movable) blades 16 and 17.

Alternatively, if fixing type shield plates (not shown in detail) are arranged instead of the horizontally movable first rectangular blades 16 and 17, limitations are made in the above-described "SID" and common projection field.

The present invention has been made in an attempt to solve the above-described problems of the conventional X-ray beam limiting apparatus, and therefore, has an object to provide an X-ray beam limiting apparatus capable of perform an enlarged type X-ray stereoscopic photographing operation without restricting both "SID" and common projection field.

SUMMARY OF THE INVENTION

The above-described object and other features of the present invention may be achieved by providing an X-ray beam limiting apparatus for a stereoscopic X-ray tube (35) having first and second X-ray focal points ($R_2$:$L_2$) separated from each other by a predetermined distance ($D_2$), comprising;

pivotable blade means (6, 7) for limiting inner edges ($XR_{10a}$:$XR_{20a}$) of pyramid-shaped X-ray beams ($XR_{10}$:$XR_{20}$) emitted from the first and second X-ray focal points ($R_2$:$L_2$), while pivoting around a common center line of pivot shafts (39:39') thereof, respectively; and first slidable blade means (22:23) for limiting outer edges ($XR_{10b}$:$XR_{20b}$) of the pyramid-shaped X-ray beams ($XR_{10}$:$XR_{20}$) emitted from the first and second X-ray focal points ($R_2$:$L_2$), while sliding on a plane substantially perpendicular to travelling paths of the pyramid-shaped X-ray beams ($XR_{10}$:$XR_{20}$).

Furthermore, according to the present invention, an X-ray beam limiting apparatus (80) for a stereoscopic X-ray tube (35) having first and second X-ray focal points ($R_2$:$L_2$) separated from each other by a predetermined distance ($D_2$), comprising:

pivotable blade means (6, 7) for limiting inner edges ($XR_{10a}$:$XR_{20a}$) of pyramid-shaped X-ray beams ($XR_{10}$:$XR_{20}$) emitted from the first and second X-ray focal points ($R_2$:$L_2$), while pivoting around center lines of first and second pivot shafts (39L:39R) positionally shifted with each other; and, first slidable blade means (22:23) for limiting outer edges ($XR_{10b}$:$XR_{20b}$) of the pyramid-shaped X-ray beams ($XR_{10}$:$XR_{20}$) emitted from the first and second X-ray focal points ($R_2$:$L_2$), while sliding on a plane substantially perpendicular to travelling paths of the pyramid-shaped X-ray beams ($XR_{10}$:$XR_{20}$).

BRIEF DESCRIPTION OF THE DRAWINGS

For a better understanding of the object of the present invention, reference is made to the following detailed description of the invention to be read in conjunction with the following drawings, in which.

DETAILED DESCRIPTION OF PREFERRED EMBODIMENT

Basic Idea

Figure 3:
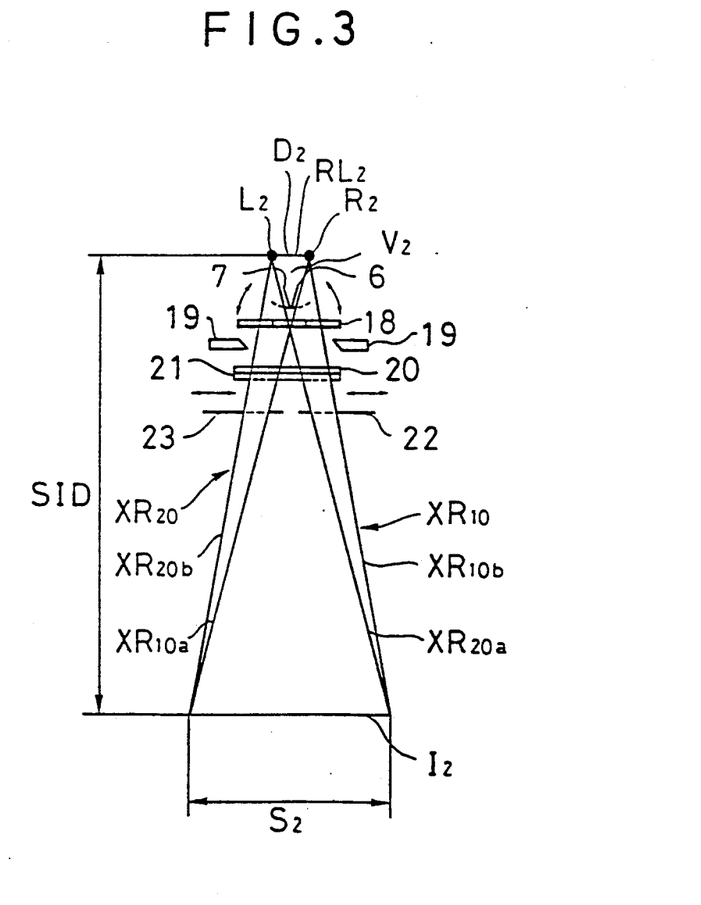
FIG. 3 pictorically represents a basic operation and arrangement of an X-ray beam limiting apparatus 30 according to a first preferred embodiment of the present invention.

Referring now to FIG. 3, a basic idea of an X-ray beam limiting apparatus according to the present invention will now be described.

As shown in FIG. 3, two sets of pivotable blades 6 and 7 are newly employed instead of the conventional horizontally movable blades 16 and 17 within a narrow triangle space $V_2$ defined by two X-ray focal points "$R_2$" and "$L_2$" separated with each other by a predetermined distance, e.g., 35 mm, and also inner edges of pyramid-shaped X-ray beams $XR_{10}$ and $XR_{20}$. The pivotable blades 6 and 7 have a function to beam-limit the inner edges $XR_{10a}$ and $XR_{20a}$ of the pyramid-shaped X-ray beams "$XR_{10}$" and "$XR_{20}$" in order that a desirable common projection field "$S_2$" at the X-ray detecting plane "$I_2$" apart from the two focal points "$R_2$" and "$L_2$" by the distance of "SID", may be established by these pyramid-X-ray beams "$XR_{10}$" and $XR_{20}$". Also, the movable blades 22 and 23 outside the above-described pivotable blades 6 and 7 have the function to beam-limit the outer edges "$XR_{10b}$" and "$XR_{20b}$" of these pyramid-shaped X-ray beams "$XR_{10}$" and "$XR_{20}$".

As previously described, when an X-ray tube with a shorter distance between two focal points $R_2$ and $L_2$ is employed, for instance, approximately 35 mm, the triangle space $V_2$ defined by a line "$RL_2$" connecting these focal points "$R_2$", "$L_2$" and also the inner edges "$XR_{10a}$" and "$XR_{20a}$" becomes narrower, as compared with that of the normal distance of 63 mm. Since, according to the basic idea of the present invention, the pivotable blades "6" and "7" are newly employed within the triangle space "$V_2$"; and are pivotable around either a common center line of first and second pivot shafts 39 and 39' (see FIG. 4), or two positionally-shafted center lines of pivot shafts 39R and 39L (see FIG. 6), the entire pivotable blade construction may be made compact and therefore may be readily arranged within such a narrower triangle space $V_2$. Apparently, these pivotable blades 6 and 7 may be pivotable under other different pivoting conditions such that the center line of the first pivot shaft 39 intersects with the center line of the second pivot shaft 39'.

CONSTRUCTION OF FIRST X-RAY BEAM LIMITING APPARATUS

Figure 4:
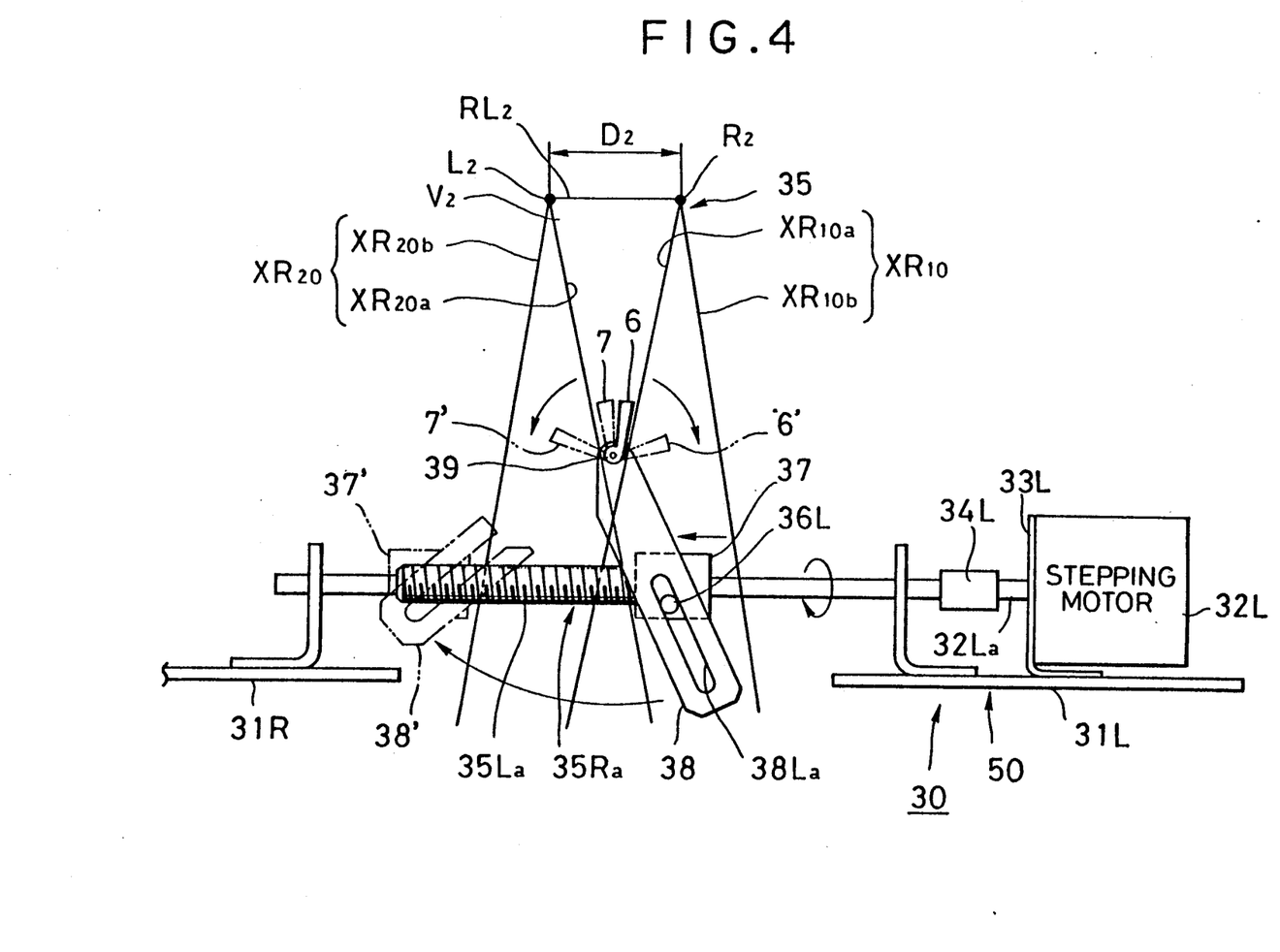
FIG. 4 is a front view of a major portion of the first X-ray beam limiting apparatus 30.
Figure 5:
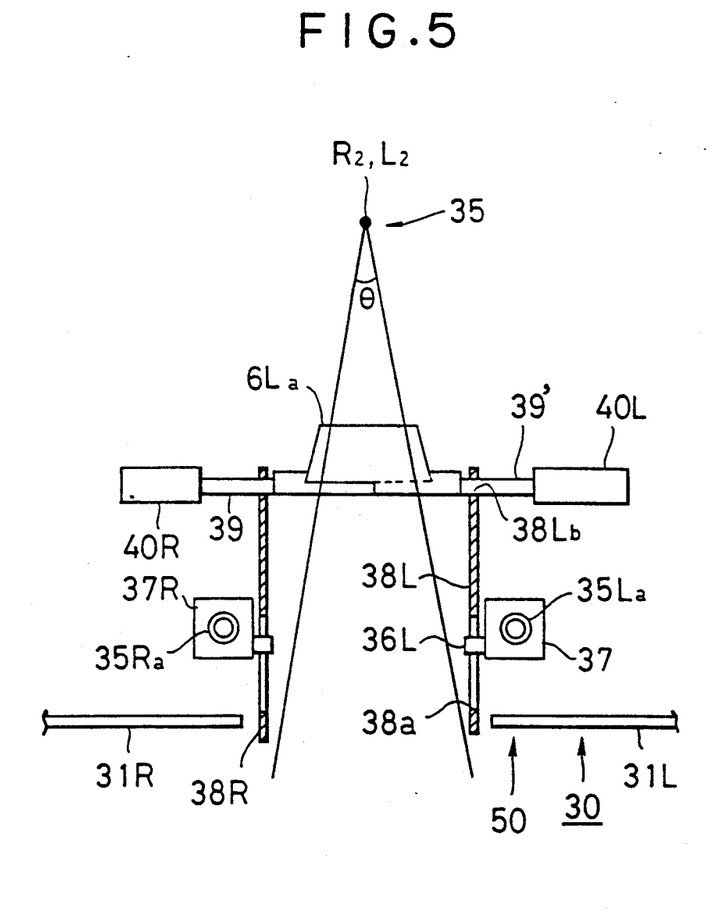
FIG. 5 is a side view of this major portion of the first X-ray beam limiting apparatus 30.

In FIGS. 4 and 5, there are shown a construction of an X-ray beam limiting apparatus 30 according to a first preferred embodiment of the present invention.

Roughly speaking, a major feature of this first X-ray beam limiting apparatus 30 is to substitute the above-described first rectangular blades 16 and 17 which are horizontally moved, by the pivotable blades 6 and 7. As previously described, since other components (i.e., the circular limiting blade 18, compensating filter blade 19, second rectangular blades 20, 21 and third rectangular blades 22 and 23) of the conventional X-ray beam limiting apparatus 10 are similarly employed in this first X-ray beam limiting apparatus 30, no further explanation thereof is made in the following description.

Accordingly, both the pivotable blades 6, 7 and a pivoting mechanism 50 will now be described more in detail.

A stereoscopic X-ray tube 35 to which the first X-ray beam limiting apparatus 30 has been applied, has two sets of X-ray focal points "$R_2$" and "$L_2$" mutually separated with each other by a distance of approximately 35 mm. The pivotable blades 6 and 7 are arranged in such a manner that these blades 6 and 7 are pivotable within the triangle space "$V_2$" defined by the inner edges "$XR_{10a}$", "$XR_{20a}$" of the pyramid X-ray beams $XR_{10}$, $XR_{20}$ irradiated via the X-ray focal point from this steroscopic X-ray tube 35 and the line "$RL_2$" connecting the two focal points "$R_2$" and "$L_2$". It should be noted that although the pivoting mechanism 50 are symmetrically positioned for the respective pivotable blades 6 and 7, only one pivoting mechanism 50 for one pivotable blade 6 is illustrated in FIGS. 4 and 5, for the sake of simplicity.

As clearly shown in FIG. 4, this pivoting mechanism 50 is constructed of a stepping motor "32L" which is fixed on a base "31L" and functions as a driving source to cause the pivotable blade 6 to be pivotable; a lead screw shaft 35La pivotably journaled to the base 31L by an L-shaped member "33L" and also mechanically coupled by a coupling member "34L" to an output shaft "32La" of this stepping motor 32L; a nut "37L" having a pin "36L" and screwed to a lead screw part "35La" of this shaft "35L"; and also a guide plate "38L" which is pivotable with respect to a center line of a first pivot shaft "39" as a pivotable center by inserting the pin 36L of the nut 37L into a slot "38La". The pivotable blade 6 is fixed at a tip portion of the guide plate 38L so that this blade 6 is pivotable around the center line of this first pivot shaft 39 in cooperation with the pivotable operation of this guide plate 38L.

As represented in FIG. 5, the pivotable blade 6 has an X-ray shielding part "6La" made of, for instance, lead, and also the above-described first pivot shaft 39 fixed at a tip portion of this X-ray shielding part "6La". A size of this X-ray shielding part "6La" is so selected as to sufficiently cover an extending angle "$\Theta$" between the two pyramid-shaped X-ray beams "$XR_{10}$" and "$XR_{20}$" irradiated from the focal points $R_2$ and $L_2$ of the stereoscopic X-ray tube 35. As previously explained, a center of the first pivot shaft 39 of one pivotable blade 6 is so arranged as to be positionaly coincident with a center of a second pivot shaft 39' (shown in FIG. 5) of the other pivotable blade 7 (i.e., a common center line of the first and second pivot shafts), whereby the entire pivoting mechanism for causing both these blades 6 and 7 pivotably may be made compact. An intermediate part of the first pivot shaft 39 passes through a through hole "38Lb" of the guide plate 38L and fixed therein, whereas a ball bearing 40 for rotatably supporting the first pivot shaft 39 is arranged at a rear end part of the second pivot shaft 39'.

One pivotable blade 6 limits one inner edge "$XR_{10a}$" of the pyramid-shaped X-ray beam "$XR_{10}$", whereas the other pivotable blade 7 limits the other inner edge $XR_{20a}$ of the pyramid-shaped X-ray beam "$XR_{20}$".

The stepping motors 32L and 32R (not shown) drive these pivotable blades 6 and 7 to pivot up to a center portion of each of these pyramid-shaped X-ray beams $XR_{10}$ and $XR_{20}$, as shown in FIG. 4, in such a manner that the angle extending between these pyramid-shaped X-ray beams $XR_{10}$ and $XR_{20}$ emitted from the stereoscopic X-ray tube 35 via the X-ray focal points $R_2$ and $L_2$ corresponds to the common X-ray projection field at the X-ray detecting plane $I_2$. In other words, upon rotation of the stepping motor 32L, the nut 37L is transported via the lead screw part 35La up to a position 37' indicated by a two-dot/dash line, the guide plate 38L pivots around the first pivot shaft 39 as a center up to a position 38' also indicated by a two-dot/dash line, and thus one blade 6 many pivot up to a position 6' indicated by a two-dot/dash line. Similarly, the other pivotable blade 7 many pivot up to another position 7' represented by a two-dot/dash line by means of the stepping motor 32R (not shown), whereby this pivotable blade 7 may continuously pivot up to the symmetric position with respect to the pivoting position of the remaining pivotable blade 6.

In accordance with the first X-ray beam limiting apparatus 30 with the above-described common pivotable center line for both the pivotable blades 6 and 7; these pivotable blades 6 and 7 may be arranged within the triangle space $V_2$ defined by the inner edges $XR_{10a}$ and $XR_{20a}$ of the respective pyramid-shaped X-ray beams $XR_{10}$ and $XR_{20}$, and also the line $RL_2$ for connecting the focal points $R_2$ and $L_2$, and may perform the X-ray beam limiting function, even if the stereoscopic X-ray tube 35 with the narrower distance between the X-ray focal points $R_2$ and $L_2$. As a consequence, it may provide such an X-ray beam limiting apparatus 30 capable of the enlarged type stereoscopic radiography or fluoroscopy without restricting the dimensions of SID and common projection field.

CONSTRUCTION OF SECOND X-RAY BEAM LIMITING APPARATUS

Figure 6:
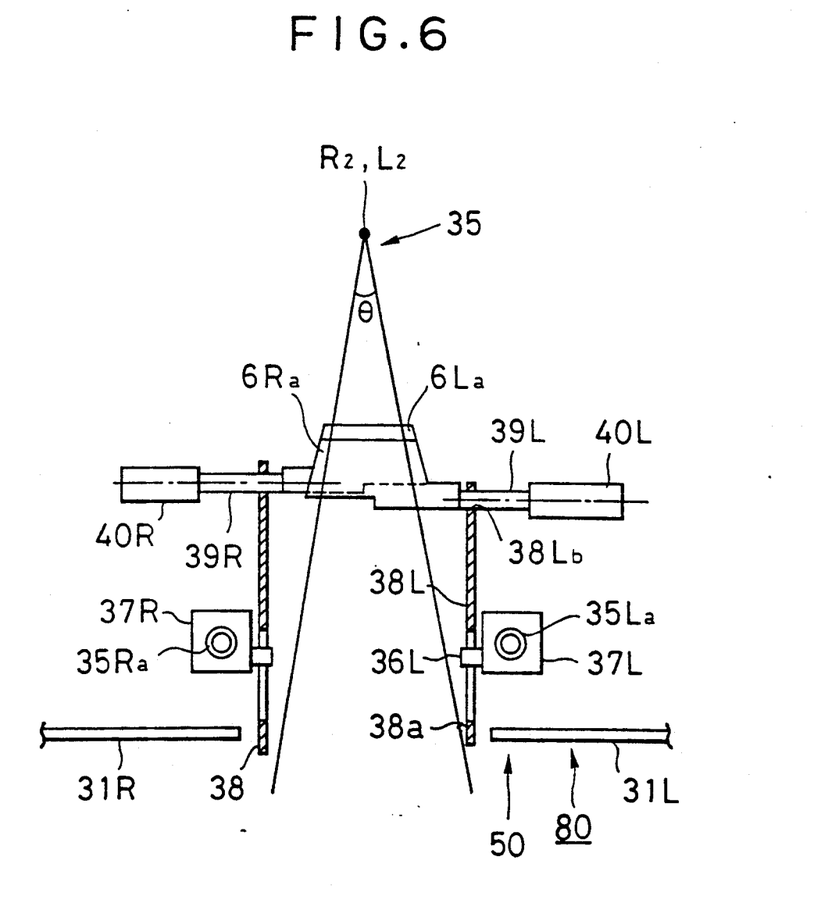
FIG. 6 is a side view of a major portion of an X-ray beam limiting apparatus 80 according to a second preferred embodiment of the present invention; and, FIG. 7 pictorically illustrates a basic operation and arrangement of an X-ray beam limiting apparatus 90 according to a third preferred embodiment of the present invention.

FIg. 6 schematically represents a construction of an X-ray beam limiting apparatus 80 according to a second preferred embodiment of the present invention.

A major feature of the second X-ray beam limiting apparatus 80 is such that one pivot shaft 39L for one pivotable blade 6 is positionally shifted from the other pivot shaft 39R for the other pivot blade 7, namely a center line of the first pivot shaft 39L is not positionally coincident with another center line of the second pivot shaft 39R. As a result, an X-ray shielding part "6La" of the first pivot shaft 39L is positionally shifted with respect to the other X-ray shielding part "6Ra" of the second pivot shaft 39R, as illustrated in FIG. 6.

MODIFICATIONS

As apparent from the foregoing descriptions, the present invention is not limited to the above-described first and second preferred embodiments, but may be readily modified without departing from the technical scope and spirit of the present invention.

Figure 7:
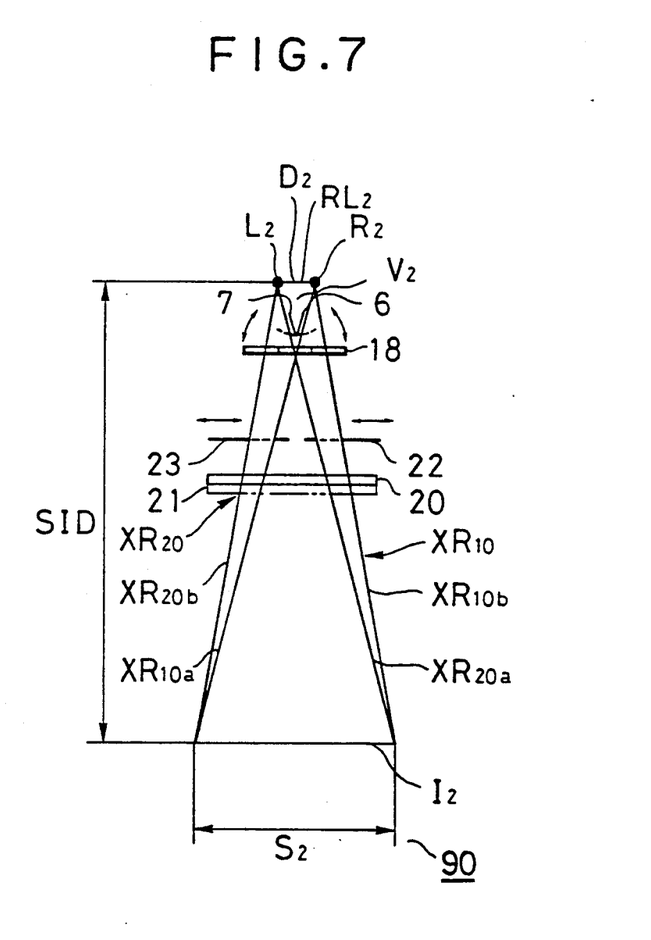

For instance, as illustrated in FIG. 7, another X-ray beam limiting apparatus 90 may be realized by employing the combination of the pivotable blades 6 and 7 with the common pivot center, and furthermore only the circular fixing blade 18, the rectangular blades 22, 23 and the rectangular blades 20, 21, which are positioned in this order along the X-ray beam travelling path. As obvious from FIG. 7, a feature of this X-ray beam limiting apparatus 90 is that the compensating filter blade 19 has been omitted and the positional relationship between the rectangular blades 20;21 and 22;23 is different from that of the first and second X-ray beam limiting apparatuses 30 and 80. Moreover, although not shown in the drawings, many other X-ray beam limiting apparatuses with other blade combinations may be realized, for instance, the combination of the circular fixing blade 18, compensating filter blade 19 and rectangular blades 22, 23 with the pivotable blades 6 and 7 shown in FIG. 6.

I claim:

1. An X-ray beam limiting apparatus for a stereoscopic X-ray tube having first and second X-ray focal points separated from each other by a predetermined distance, comprising;
   pivotable blade means for limiting inner edges of pyramid-shaped X-ray beams emitted from the first and second X-ray focal points, while pivoting around a common center line of pivot shafts, respectively; and,
   first slidable blade means for limiting outer edges of the pyramid-shaped X-ray beams emitted from the first and second X-ray focal points, while sliding on a plane substantially perpendicular to travelling paths of the pyramid-shaped X-ray beams.

2. An X-ray limiting apparatus as claimed in claim 1, wherein said pivotable blade means each includes:
   a stepping motor driven by pulse signals;
   a lead screw member pivotably driven by the stepping motor;
   a guide plate member pivotably journalled to the lead screw member; and
   a blade with an X-ray beam shielding part pivotably driven by the guide plate member.

3. An X-ray limiting apparatus as claimed in claim 1, further comprising:
   a circular fixed blade positioned between said pivotable blade means and said first slidable blade means, for shielding the pyramid-shaped X-ray beams which exceed an outer case of an X-ray detecting plane of the X-ray tube.

4. An X-ray limiting apparatus as claimed in claim 3, further comprising:
   a compensating filter blade positioned below said circular fixed blade along the X-ray travelling paths, for compensating X-ray absorption occurring in an organ of a biological body under medical examination; and
   a second slidable blade means positioned below said compensating filter blade along the X-ray travelling paths, for setting an X-ray projection field of the X-ray tube.

5. An X-ray limiting apparatus as claimed in claim 3, further comprising:
   a second slidable blade means positioned below said first slidable blade means along the X-ray travelling paths, for setting an X-ray projection field of the X-ray tube.

6. An X-ray limiting apparatus as claimed in claim 1, wherein said distance of the first and second focal points is selected to be approximately 35 mm.

* * * * *